(12) United States Patent
Otsuka et al.

(10) Patent No.: US 8,793,937 B2
(45) Date of Patent: Aug. 5, 2014

(54) WEATHER STRIP FOR MOTOR VEHICLE

(75) Inventors: Hirofumi Otsuka, Kiyosu (JP); Masatoshi Hotta, Kiyosu (JP)

(73) Assignee: Toyoda Gosei Co., Ltd., Kiyosu-Shi, Aichi-Ken (JP)

( * ) Notice: Subject to any disclaimer, the term of this patent is extended or adjusted under 35 U.S.C. 154(b) by 0 days.

(21) Appl. No.: 13/137,635

(22) Filed: Aug. 30, 2011

(65) Prior Publication Data

US 2012/0073209 A1   Mar. 29, 2012

(30) Foreign Application Priority Data

Sep. 28, 2010 (JP) ................................ 2010-216625
Jul. 20, 2011 (JP) ................................ 2011-159113

(51) Int. Cl.
*E06B 7/16* (2006.01)

(52) U.S. Cl.
USPC ........................................................ 49/490.1

(58) Field of Classification Search
USPC ........... 49/490.1, 498.1, 475.1; 428/138, 122, 428/136
See application file for complete search history.

(56) References Cited

U.S. PATENT DOCUMENTS

| | | | | |
|---|---|---|---|---|
| 3,165,793 A | * | 1/1965 | Lynch | 49/479.1 |
| 3,706,628 A | * | 12/1972 | Azzola | 28/122 |
| 4,333,221 A | * | 6/1982 | Hayashi | 29/413 |
| 4,424,976 A | * | 1/1984 | Hayashi | 277/642 |
| 4,523,448 A | * | 6/1985 | Sakai et al. | 72/185 |
| 4,676,856 A | * | 6/1987 | Shigeki et al. | 156/201 |
| 5,072,546 A | * | 12/1991 | Ogawa | 49/490.1 |
| 5,204,157 A | * | 4/1993 | Matsumiya | 428/105 |
| 5,755,071 A | * | 5/1998 | Drozd | 52/716.8 |
| 5,783,312 A | * | 7/1998 | Laughman et al. | 428/573 |
| 6,306,522 B1 | * | 10/2001 | Strutz et al. | 428/595 |
| 6,435,597 B1 | * | 8/2002 | Anders et al. | 296/107.07 |
| 6,548,143 B1 | * | 4/2003 | Heller | 428/122 |
| 6,684,574 B2 | * | 2/2004 | Hayashi | 49/490.1 |
| 6,726,978 B2 | * | 4/2004 | Sehr | 428/134 |
| 6,854,240 B2 | * | 2/2005 | Mizuno et al. | 52/716.5 |
| 7,044,525 B2 | * | 5/2006 | Miyakawa et al. | 296/1.08 |
| 7,687,133 B2 | * | 3/2010 | Iwasa et al. | 428/122 |
| 8,205,390 B2 | * | 6/2012 | Ogilvie | 49/490.1 |
| 2002/0050101 A1 | * | 5/2002 | Hayashi | 49/490.1 |

(Continued)

FOREIGN PATENT DOCUMENTS

JP   2002-200944 (A)   7/2002
JP   2003-019929 (A)   1/2003

(Continued)

*Primary Examiner* — Katherine Mitchell
*Assistant Examiner* — Scott Denion
(74) *Attorney, Agent, or Firm* — McGinn IP Law Group, PLLC

(57) ABSTRACT

A weather strip having an insert and exhibiting a large holding force against a flange, includes a trim portion and a sealing portion. The trim portion has an outer holding lip formed to extend from an interior surface of an outer side wall, and an inner holding lip formed to extend from an interior surface of an inner side wall, and the insert is embedded in the trim portion. The insert is formed from a band-shaped metallic plate such that a large number of insert pieces, each having a rectangular configuration, extend in a width direction of the band-shaped metallic plate, and are joined in the vicinity of ends of the insert pieces with joining parts in a longitudinal direction of the band-shaped metallic plate into a ladder-shaped configuration. Slits are formed between adjacent insert pieces.

12 Claims, 10 Drawing Sheets

(56) References Cited

U.S. PATENT DOCUMENTS

| | | |
|---|---|---|
| 2004/0043188 A1* | 3/2004 | Tsujiguchi .................... 428/122 |
| 2004/0081796 A1* | 4/2004 | Miyakawa et al. ........... 428/122 |
| 2005/0184415 A1 | 8/2005 | Ohashi |
| 2005/0233110 A1* | 10/2005 | Miyakawa et al. ........... 428/122 |
| 2008/0026196 A1* | 1/2008 | Iwasa et al. ................... 428/213 |
| 2010/0086732 A1* | 4/2010 | Tamura ......................... 428/131 |
| 2011/0159311 A1* | 6/2011 | Hotta et al. ................... 428/596 |

FOREIGN PATENT DOCUMENTS

| | | |
|---|---|---|
| JP | 2005-014792 (A) | 1/2005 |
| JP | 2005-231222 (A) | 9/2005 |
| JP | 2008-001123 (A) | 1/2008 |
| JP | 2008-221660 (A) | 9/2008 |
| JP | 2008-254533 (A) | 10/2008 |
| JP | 2008-265068 (A) | 11/2008 |

\* cited by examiner

WEATHER STRIP FOR MOTOR VEHICLE

CROSS-REFERENCE TO RELATED APPLICATION

This application is related to and claims priority from Japanese patent Application No. 2010-216625 incorporated herein by reference.

BACKGROUND OF THE INVENTION

1. Field of the Invention

The present invention relates to a weather strip for a motor vehicle, which is formed by extrusion and used to provide a seal between a door member such as a vehicle door, a trunk lid, etc., and a periphery around an opening in a vehicle body.

2. Description of Related Art

As shown in FIG. 1, a weather strip 10 for a motor vehicle has a trim portion 12 as a base portion for attachment to a periphery around an opening in a vehicle body, and a tubular sealing portion 14 for contacting a door member and providing a seal between the vehicle body and the door member. The trim portion 12 has an outer side wall 16, an inner side wall 18 and a bottom wall 20 and has a generally U-shaped cross-section, and in order to enlarge the gripping force of the trim portion 12, an insert 22 produced by forming slits in a band-shaped metallic plate, and rolling or punching the same is embedded in the trim portion 12 (see Publication of Japanese Utility model application No. 2005-231222, for example). A first outer holding lip 24 and a second outer holding lip 26 are formed in an interior surface of the outer side wall 16, and a first inner holding lip 28 and a second inner holding lip 30 are formed in an interior surface of the inner side wall 18.

As shown in FIG. 2, this insert 22 is composed of a large number of rectangular insert pieces 32, each extending in a widthwise direction of the insert 22, and the insert pieces 32 are joined to each other in their both ends with joining parts extending in a longitudinal direction to define a ladder-like configuration. The joining parts are formed by rolling the both ends of the insert pieces 32, thereby defining first joining parts 34, each having a smaller width so as to be readily breakable, and second joining parts 36, each having a larger width so as to be difficult to break. The first joining parts 34 and adjacent insert pieces 32 define first slits 38, whereas the second joining parts 36 and adjacent insert pieces 32 define second slits 41.

Upon producing a long product, namely upon feeding the insert 22 to an extruder and forming a covering layer of a rubber-like elastic body therearound, the joining parts of the insert 22 remain joined for facilitating taking up of the long product. But, when the long product is used to be attached along corners of the flange, etc., the joining parts are separated for enhancing the flexibility of the trim portion 12.

Therefore, after extruding the long product, the first joining parts 34 of the insert 22 are broken and separated, and consequently, there exist in the trim portion 12, a plurality of pairs of insert pieces 32, each being joined on an upper side and a lower side thereof with the second joining parts 36, thereby defining the second slits 41.

Recently, in order to protect the global environment, the reduction of the weight of motor vehicles has been demanded, and the reduction of the weight of the weather strip 10 has been also demanded. In order to respond to this demand, the thickness of the side walls of the trim portion 12 has been tried to be reduced. And in order to reduce the weight of the insert 22, the thickness of the insert 22 has been considered to decrease, thereby rolling the joining parts greatly and increasing the length of rolled portions.

When a flange 40 formed in a door or along the periphery of the door opening portion is inserted in an interior of the trim portion 12, the first outer holding lip 24, the second outer holding lip 26, the first inner holding lip 28 and the second inner holding lip 30 respectively hold the flange 40, thereby attaching the weather strip 10 to the vehicle body. Especially, the first outer holding lip 24 and the second outer holding lip 28 provided on the side of the bottom wall 20 exhibit great holding forces against the flange 40 so as to be important for holding the flange 40.

The covering layer of the rubber-like elastic body, which composes the trim portion 12, is formed on both sides of the insert 22 of the trim portion 12. The covering layer of the rubber-like elastic body formed on both sides of the insert 22 is integrally joined via the first slits 38 and the second slits 41, whereby the covering layer is secured to the insert 22.

However, the covering layer of the rubber-like elastic body on both sides of the first joining parts 34 and the second joining parts 36 of the insert 22 is not integrally joined but separated. And where the thickness of the covering layer is decreased for reducing the weight of the weather strip, the longitudinal length of the first joining parts 34 and that of the second joining parts 36 after rolled becomes great.

Therefore, as shown in FIG. 1 and FIG. 3, where a base 42 of the first outer holding lip 24 and/or a base 44 of the second outer holding lip 28 face the first joining parts 34 and the second joining parts 36, the base 42 of the first outer holding lip 24 and/or the base 44 of the second outer holding lip 28 may separate from the insert 22, whereby the holding force of the first outer holding lip 24 and/or the second outer holding lip 28 against the flange 40 may decrease so that the extraction load of the trim portion 12 from the flange 40 may decrease.

And, as shown in FIG. 4, there is a weather strip 46 having a trim portion 48 and a tubular sealing portion 50, in which an insert 52 is not separated after extrusion (see Publication of Japanese Patent application No. 2008-265068 and Publication of Japanese Patent application No. 2002-200944, for example). In this weather strip 46, the trim portion 48 includes an outer side wall 54, an inner side wall 56 and a bottom wall 58 with a generally U-shaped cross-section, and an outer holding lip 60 and an inner holding lip 62 are formed in interior surfaces of the outer side wall 54 and the inner side wall 56. In order to improve the flexibility of the weather strip 46, joining parts 64 of the insert 52 are located away from parts facing a base 66 of the outer holding lip 60 and a base 68 of the inner holding lip 62 towards the bottom wall 58.

In order to form this weather strip 46, the insert 52 with a plate-shaped configuration is extruded with a covering layer, and subjected to the bending work into a generally U-shaped cross-section. At this time, the joining parts 64 of the insert 52 may come close to bent parts between the bottom wall 58 and the outer side wall 54 and the inner side wall 56, whereby the insert 52 may be bent in the vicinity of the joining parts 64 and consequently, the trim portion 48 may be deformed.

In addition, the outer side wall 54 and the inner side wall 56 peel off and swell inwardly in the vicinity of the joining parts 64, and consequently, the insertion of the flange 40 may become insufficient, or upon attaching a sealer and a waterproof sponge to the trim portion 48, the attaching positions thereof may vary to degrade the sealing properties against a tip end of the flange 40.

Furthermore, the length from the joining parts 64 to ends of rectangular pieces 70 of the insert 52 becomes great to increase an extrusion resistance upon extruding a covering layer of the trim portion 48.

SUMMARY OF THE INVENTION

It is an object of the present invention to provide a weather strip having an insert, exhibiting a strong holding force against a flange, and capable of being produced readily.

In order to achieve the above-described object, in accordance with a first aspect of the present invention, a weather strip including a trim portion for holding a flange formed around an opening portion of a vehicle body of a motor vehicle, or a closing member for closing the opening portion, and a sealing portion for contacting and sealing a facing member, is characterized in that the trim portion has an outer side wall, an inner side wall and a bottom wall with a generally U-shaped cross-section, the trim portion has an outer holding lip formed to extend from an interior surface of the outer side wall, and an inner holding lip formed to extend from an interior surface of the inner side wall, an insert formed by processing a band-shaped metallic plate is embedded in the trim portion, the insert includes a large number of insert pieces, each having a rectangular configuration and extending in a width direction of the band-shaped metallic plate, the insert pieces are joined with joining parts in a longitudinal direction of the band-shaped metallic plate in the vicinity of both ends of the insert pieces into a ladder-shaped configuration, the insert pieces define slits between adjacent insert pieces, and widthwise centers of the joining parts are located away from parts facing a base of the outer holding lip and a base of the inner holding lip towards the both ends of the insert pieces.

With the arrangement of the first aspect of the present invention, the trim portion has an outer side wall, an inner side wall and a bottom wall with a generally U-shaped cross-section, the trim portion has an outer holding lip formed to extend from an interior surface of the outer side wall and an inner holding lip formed to extend from an interior surface of the inner side wall, and an insert formed by processing a band-shaped metallic plate is embedded in the trim portion. Therefore, the outer holding lip and the inner holding lip can exhibit enlarged holding forces against the flange so that where the wall thickness of the trim portion is decreased, the flange is prevented from coming out of the trim portion.

The insert includes a large number of insert pieces, each having a rectangular configuration and extending in a width direction of the band-shaped metallic plate, the insert pieces are joined with joining parts in a longitudinal direction of the band-shaped metallic plate in the vicinity of both ends of the insert pieces into a ladder-shaped configuration, and the insert pieces define slits between adjacent insert pieces. Therefore, the insert can be readily formed from the band-shaped metallic plate efficiently by applying pressure and tensile force thereto, and by virtue of the slits, the insert can be secured to a covering layer of the trim portion.

Widthwise centers of the joining parts are located away from parts facing a base of the outer holding lip and a base of the inner holding lip towards the both ends of the insert pieces. Therefore, the base of the outer holding lip and the base of the inner holding lip can be provided in the positions where the slits of the insert are located so that the bases do not peel off the insert, thereby enlarging the holding forces of the outer holding lip and the inner holding lip against the flange.

In addition, since the widthwise centers of the joining parts are located on the sides of the both ends of the insert pieces, at the time the flat insert is bent into a generally U-shaped cross-section after the extruding process along with the covering layer, the joining parts are located away from bent parts so that the joining parts are prevented from being bent, and the generally U-shaped cross-section of the insert is prevented from being deformed.

Furthermore, the interior surfaces of the outer side wall and the inner side wall are prevented from peeling off to swell out in the vicinity of the joining parts so that the flange is prevented from insufficiently inserted in the trim portion, or a sealer and a water stop sponge are prevented from coming out of the trim portion when inserted. And since the length from the joining parts to the ends of the insert pieces is small, the extruding resistance is decreased upon extruding the covering layer of the trim portion, thereby facilitating the extrusion of the trim portion.

In accordance with a second aspect of the present invention, slits are formed between adjacent insert pieces, the slits include first slits, each having a large width in a longitudinal direction of the insert, and second slits, each having a width smaller than that of the first slits in the longitudinal direction, the first slits and the second slits are alternately arranged in the longitudinal direction of the insert, and the insert is separated along the first slits after the production of the weather strip.

With the second aspect of the present invention, the number of insert pieces per unit length can be decreased by virtue of the first slits with a larger width, whereby the weight of the insert can be reduced, and accordingly the weight of vehicle bodies can be reduced. In addition, the insert can be readily separated along only the first joining parts formed thinner and narrower than the remaining parts of the insert pieces after the extrusion work with the inserts embedded in long products, and the insert can be separated with two insert pieces joined, whereby the flexibility of the long products and the stiffness of the insert can be ensured.

In accordance with a third aspect of the present invention, the joining parts include first joining parts, each being formed at an end of each of the first slits and having a small width in a width direction of the insert, and second joining parts, each being formed at an end of each of the second slits and having a width larger than that of the first joining parts in the width direction of the insert. The first joining parts and the second joining parts are alternately arranged in the longitudinal direction of the insert, and after the weather strip is formed, the first joining parts are separated such that pairs of insert pieces joined are separated from one another.

With the arrangement of the third aspect of the present invention, the first joining parts, each being formed at an end of each of the first slits and having a small width in a width direction of the insert, and second joining parts, each being formed at an end of each of the second slits and having a width larger than that of the first joining parts in the width direction are alternately formed in the longitudinal direction of the insert, and after the weather strip is formed, the first joining parts are separated such that pairs of insert pieces joined are separated from one another. Therefore, the flexibility of the trim portion is increased so that the weather strip can be attached along curved surfaces of the opening portions in vehicle bodies and the closing members for closing the opening portions, and the covering layer of the trim portion and the insert can be secured to each other by virtue of the slits, each being defined between adjacent joined two insert pieces, whereby the holding force of the trim portion against flanges can be enlarged.

In accordance with a fourth aspect of the present invention, the trim portion has a first outer holding lip and a second outer holding lip formed to extend from an interior surface of the outer side wall in this order from the side of the bottom wall, and has a first inner holding lip and a second inner holding lip formed from an interior surface of the inner side wall in this order from the side of the bottom wall, widthwise centers of the first joining parts are located away from parts facing a base of the outer holding lip and a base of the inner holding lip towards the ends of the insert pieces.

With the arrangement of the fourth aspect of the present invention, the trim portion has a first outer holding lip and a second outer holding lip formed to extend from an interior surface of the outer side wall in this order from the side of the bottom wall, and has a first inner holding lip and a second inner holding lip formed from an interior surface of the inner side wall in this order from the side of the bottom wall. Therefore, two holding lips formed on each of the outer side wall and the inner side wall can hold the flange stably.

The widthwise centers of the first joining parts are located away from parts facing a base of the outer holding lip and a base of the inner holding lip towards the ends of the insert pieces. Therefore, the base of the outer holding lip and the base of the inner holding lip, which exhibit large holding forces against the flange, do not peel off the insert, whereby the holding force of the trim portion against flanges can be enlarged.

In accordance with a fifth aspect of the present invention, entire parts of the first joining parts are located away from parts facing a base of the outer holding lip and a base of the inner holding lip towards the ends of the insert pieces.

With the arrangement of the fifth aspect of the present invention, the entire parts of the first joining parts are located away from parts facing a base of the outer holding lip and a base of the inner holding lip towards the ends of the insert pieces so that the base of the outer holding lip and the base of the inner holding lip are secured to the insert more strongly, whereby the holding force of the trim portion against flanges can be enlarged.

In accordance with a sixth aspect of the present invention, widthwise centers of both the first joining parts and the second joining parts are located away from parts facing the base of the first outer holding lip and the base of the first inner holding lip towards the ends of the insert pieces.

With the arrangement of the sixth aspect of the present invention, the widthwise centers of both the first joining parts and the second joining parts are located away from parts facing the base of the first outer holding lip and the base of the first inner holding lip towards the ends of the insert piece. Therefore, the base of the first outer holding lip and the base of the first inner holding lip are secured to the insert in the second joining parts, too, whereby the holding force of the trim portion against flanges can be prevented from lowering.

In accordance with a seventh aspect of the present invention, surfaces of the joining parts, which define the ends of the slits, are respectively formed into an arc-shaped notch.

With the seventh aspect of the present invention, since the surfaces of the joining parts, which define the ends of the slits, are respectively formed into an arc-shaped notch, an area of the slits enlarges, as compared to that of the slits of which the ends respectively have a triangular configuration, thereby enlarging an area of both sides of the insert, to which the covering layer are adapted to be secured.

In accordance with an eighth aspect of the present invention, the depth of the notch in the first joining part is at least equal to the width of the first slit.

With the eighth aspect of the present invention, since the depth of the notch in the first joining parts is at least equal to the width of the first slit, the first joining parts are readily separated from each other, and the area of both sides of the insert, to which the covering layer are adapted to be secured, can be enlarged.

In accordance with a ninth aspect of the present invention, a rolled portion is provided along ends of the insert pieces, respectively, and an inner side section of the rolled portion, which is defined between ends of the first slits and an inner side end of the rolled portion, includes ends of the first slits and the second slits, in which a material other than metal of the insert exists, in a ratio of 5% or more.

With the ninth aspect of the present invention, a rolled portion is provided along ends of the insert pieces, respectively, and an inner side section of the rolled portion, which is defined between ends of the first slits and an inner side end of the rolled portion, includes ends of the first slits and the second slits, in which a material other than metal of the insert exists, in a ratio of 5% or more. Therefore, the area of both sides of the insert, to which the covering layer is adapted to be secured, can be much enlarged.

Since the widthwise centers of the joining parts are located away from parts facing a base of the outer holding lip and a base of the inner holding lip towards the ends of the insert pieces, the base of the outer holding lip and the base of the inner holding lip can be provided in the positions where the slits of the insert are located so that they do not peel off the insert and accordingly the flange holding forces of the outer holding lip and the inner holding lip can be enlarged.

In addition, since the widthwise centers of the joining parts are located on the sides of the ends of the insert pieces, and accordingly, are away from bent parts in the bending process into a generally U-shaped cross-section, the joining parts are prevented from bending, and the generally U-shaped cross-section of the insert is prevented from being deformed. And, the interior surfaces of the outer side wall and the inner side wall are prevented from peeling off the insert to swell out in the vicinity of the joining parts so that the flange is prevented from insufficiently inserted in the trim portion, or a sealer and a water stop sponge are prevented from coming out of the trim portion when inserted. In addition, since the length from the joining parts to the ends of the insert pieces is short, the extruding resistance is decreased upon extruding the covering layer of the trim portion, thereby facilitating the extrusion of the trim portion.

Other objects, features, and characteristics of the present invention will become apparent upon consideration of the following description and the appended claims with reference to the accompanying drawings, all of which form a part of this specification.

DETAILED DESCRIPTION OF THE PREFERRED EMBODIMENTS

A first through fifth embodiments of the present invention will be explained with reference to FIG. 5 through 16.

Figure 8:
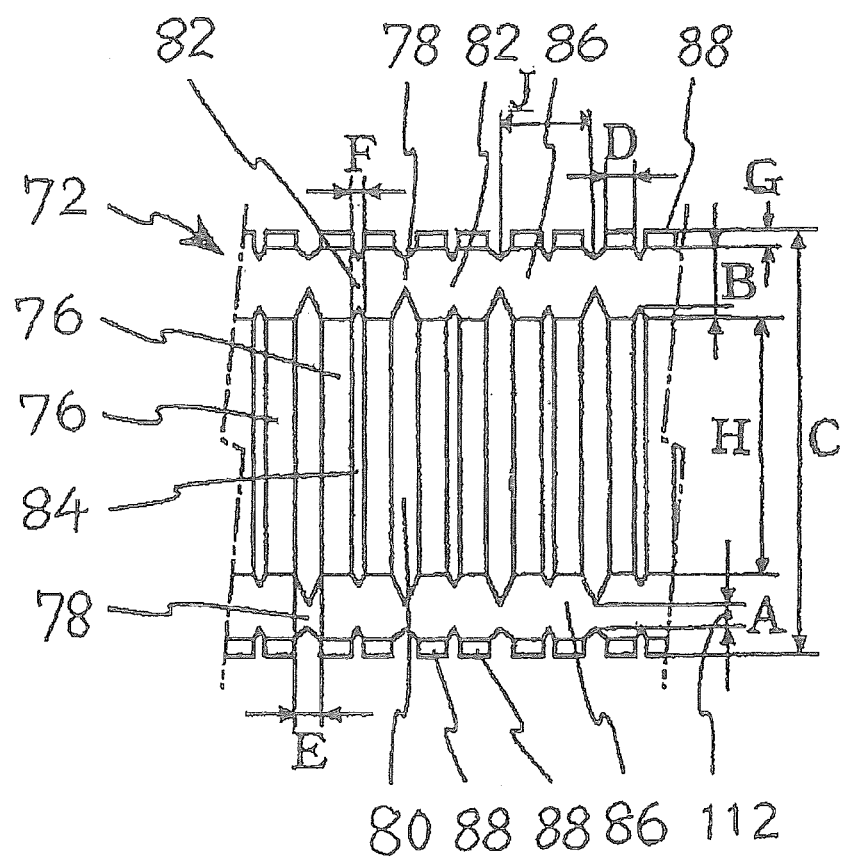
FIG. 8 is a partial plan view of an insert used in a first embodiment of a weather strip for a motor vehicle in accordance with the present invention.

First, an insert 72 will be explained, and next, a weather strip 74 will be explained. As shown in FIG. 8, the insert 72 for use in the weather strip 74 in a first embodiment of the present invention is produced by processing a band-shaped metallic plate and configured such that a large number of insert pieces 76 are respectively arranged in a width direction of the band-shaped metallic plate and are joined to each other with joining parts provided in the vicinity of both ends of the insert pieces 76 in a longitudinal direction of the band-shaped metallic plate into a ladder-like configuration.

The joining parts include first joining parts 78 with a smaller width shown by "A" in FIG. 8, which are provided at both ends of later describing first slits 80, and second joining parts 82 with a larger width shown by "B" in FIG. 8, which are provided at both ends of later describing second slits 84. The first joining parts 78 and the second joining parts 82 are alternately arranged in a longitudinal direction of the insert 72. The width of the first joining parts 78 ("A" in FIG. 8) can be determined to range from 1.5 to 3.0 mm, and is 2.5 mm in the present embodiment. The width of the second joining parts 82 ("B" in FIG. 8) can be determined to range from 2.5 to 4.5 mm, and is 3.0 mm in the present embodiment.

Figure 9:
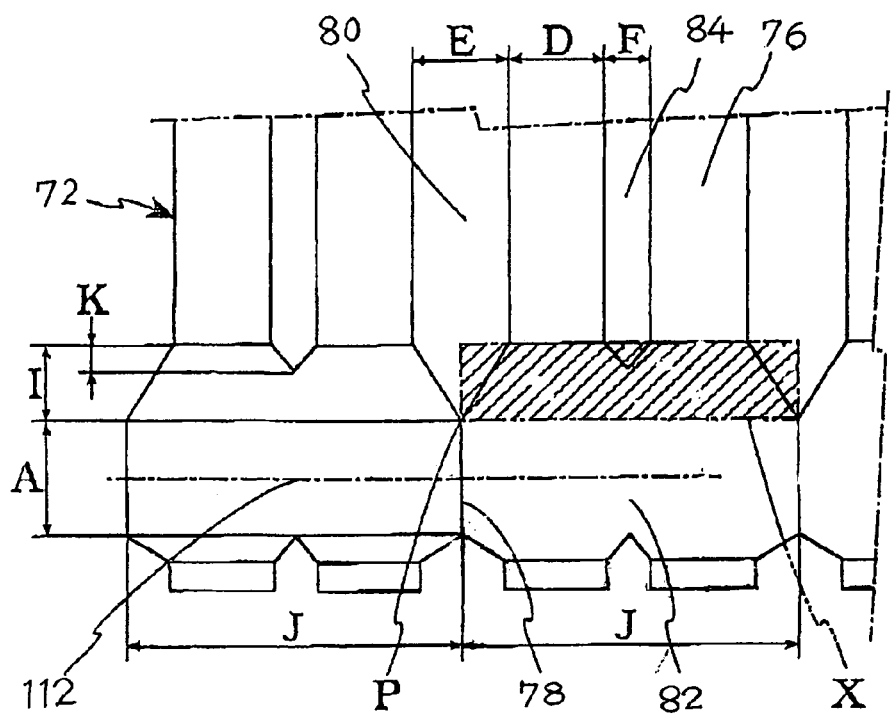
FIG. 9 is an enlarged plan view of one part of a side end of the insert in the first embodiment of a weather strip for a motor vehicle in accordance with the present invention.

The width ratio of the first joining parts 78 and the second joining parts 82 in the width direction of the insert 72 ranges from 1:2 to 2:3. Since the second joining parts 82 have a greater width, the insert 72 do not separate therealong in the insert separating process, but, as shown in FIG. 9, it can readily separate only along the first joining parts 78 with a smaller width. As a result, two rectangular insert pieces can be separated with joined with the second joining parts 82. As described later, the separation of the insert 72 is performed after a covering layer composed of a rubber-like elastic body is formed around the insert 72.

In the present embodiment, the width of each rectangular insert piece 76 in the longitudinal direction of the insert 72 ("D" shown in FIG. 8) is 2 mm, whereas the length thereof in the width direction of the insert 72 ("C" shown in FIG. 8) is 30 mm. The thickness of each rectangular insert piece 76 can be determined to range from 0.30 to 0.45 mm, and is 0.35 mm in the present embodiment. In the conventional example, the thickness has been determined to be about 0.50 mm so that the thickness of each rectangular insert piece of the present embodiment is less than that of the conventional one, whereby the weight of the weather strip 74 can be reduced. The width "D" can be determined to range from 1.8 mm to 3.2 mm. And the width "C" can be determined to range from 20 mm to 50 mm.

The thickness of each rectangular insert piece 76 ranges from 0.30 to 0.45 mm, and the thickness of the first joining parts 78 and the second joining parts 82 ranges from 0.20 to 0.35 mm. Therefore, the thickness of the insert 72 can be reduced, as compared to that of the conventional insert, whereby the weight of the weather strip 74 can be reduced. Where the thickness of the insert piece 76 is less than 0.30 mm, the flange holding force lowers, and where the thickness of the insert piece 76 exceeds 0.45 mm, the weight of the insert 72 enlarges, whereby the weight of the weather strip 74 cannot be sufficiently reduced.

Where the thickness of the first joining parts 78 and the second joining parts 82 is less than 0.20 mm, the strength thereof lowers so that they may be bent, and where the thickness of the first joining parts 78 and the second joining parts 82 exceeds 0.35 mm, the rolling work is insufficient so that the distance between the first slit 80 and the second slit 84 cannot be enlarged, whereby the weight of the weather strip cannot be sufficiently reduced.

Both ends of the rectangular insert pieces are joined with the first joining parts 78 and the second joining parts 82 so that when the insert 72 with a ladder-shaped configuration is fed to an extruder and extruded along with the rubber-like elastic material, the insert 72 can be fed to the extruder smoothly without increasing an extruding resistance of ends of the rectangular insert pieces 76, thereby facilitating the extrusion.

Slits are provided between adjacent rectangular insert pieces 76. The slits include first slits 80 with a greater width in the longitudinal direction of the insert 72, and second slits 84 with a smaller width in the longitudinal direction of the insert 72 so that they are alternately formed.

The width of the first slits 80 ("E" shown in FIG. 8) is about 2.0 mm, whereas the width of the second slits 84 ("F" shown in FIG. 8) is about 0.75 mm. The width of the first slits 80 is determined to range from 1.0 mm to 2.5 mm, whereas the width of the second slits 84 is determined to range from 0.50 mm to 1.2 mm.

FIG. 9 is an enlarged view of the first joining part 78 and the second joining part 82 in the insert 72.

The depth (I) of a notch defined with the first joining part 78 is formed equal to or greater than the width (E) of the first slit 80. In the first embodiment, the depth (I) of the first joining part 78 is about 2.6 mm, and the width (E) of the first slit 80 is 2.0 mm and can range from 1.0 mm to 2.5 mm. With this arrangement, the first joining part 78 is readily broken, and the area adapted to be secured to the covering layer can be enlarged. In the first embodiment, the depth (K) of a notch defined with the second joining part 82 is 0.8 mm.

And as shown in FIG. 9, in the first joining part 78 and the second joining part 82, the area X on the side of the slits (shown by oblique lines) includes parts in which a material other than metal of the insert exists, that is the covering layer, in the ratio of 5% or more. 7% or more is preferable, and 15% or more is more preferable. With this arrangement, the area to which the covering layer is adapted to be secured can be enlarged. In the first embodiment, 15% or more of the parts in which the covering layer exists are included.

The area X shown by oblique lines in FIG. 9 is obtained by multiplying the distance (J) between adjacent first joining parts 78 by the depth (I) of the notch defined thereby. The distance J can be expressed by the equation:

$$J=2\times D+F+E$$

There is no specific upper limit of the ratio of parts in which the covering layer exists, but upon calculating based on dimensions in the first embodiment, the maximum value is about 20%. The dimensions of the insert 72 can be changed arbitrarily, but the proper upper limit thereof is about 30%, considering the dimensions of E, F, D, I and K shown in FIG. 8 and FIG. 9. And the minimum value obtained from the dimensions in the present embodiment is about 7%, but considering a scattering of dimensions, it becomes about 5% so that at least 5% is needed.

Hereinafter, the producing method of the insert 72 will be explained.

In order to produce the insert 72, first, a band-shaped metallic plate is cut in a central part thereof with a slitter roll without partly cutting side ends of the plate, to alternately form first cut lines, each having a larger length in a width direction of the plate, which corresponds to the length of the first slit 80, and second cut lines, each having a smaller length in the width direction of the plate, which corresponds to the length of the second slit 84. And by rolling uncut areas with a rolling roll, rolled areas 86 of the insert 72 are formed, the first cut lines are enlarged to form first slits 80 and the second cut lines are enlarged to form the second slits 84. In addition, the first joining parts 78 are formed at ends of the first slits 80, whereas the second joining parts 82 are formed at ends of the second slits 84.

Consequently, the first slits 80 and the second slits 84 can be formed between adjacent rectangular insert pieces 76 without producing waste when the band-shaped metallic plate is processed. In addition, the joining parts can be formed thinner, as compared with the remaining parts (central parts of the rectangular insert pieces 76). Furthermore, a tensile force is also applied to the insert 72, the width of the first joining parts 78 is formed less than that of the second joining parts 82.

Therefore, in the insert separating step after the extruding step with the insert 72 thus arranged embedded in the weather strip 74, only the first joining parts 78, each having a smaller thickness and width, can be readily broken without breaking the second joining parts 82.

Since the first slits 80, each having a greater width, are formed, the number of the rectangular insert pieces 76 per unit length of the insert 72 can be decreased, whereby the weight of the insert 72 can be reduced, thereby contributing to the weight reduction of vehicle bodies.

Rolled portions 86 are formed in the first joining parts 78, the second joining parts 82 and ends of the rectangular insert pieces 76 between the first joining parts 78 and the second joining parts 82 by applying rolling and tensile force to the band-shaped metallic plate continuously in a longitudinal direction thereof. In the insert pieces 76, end parts 88 are formed on the side of widthwise ends of the rolled portions 86.

Figure 1:
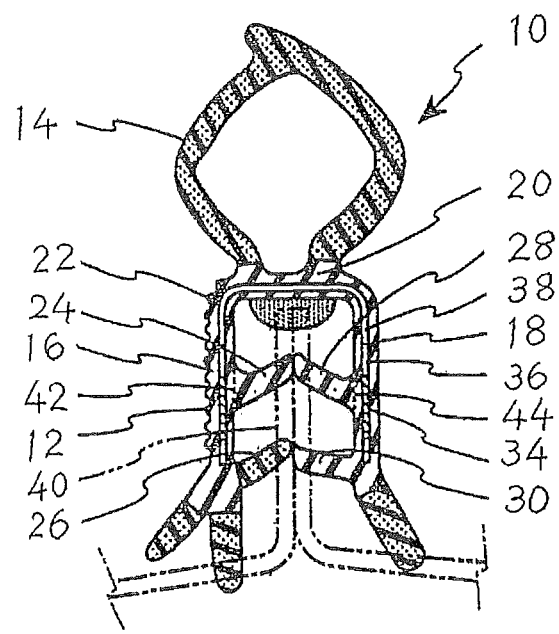
FIG. 1 is a cross-sectional view of a conventional weather strip for a motor vehicle, which is taken along joining parts of an insert used therein.
Figure 2:
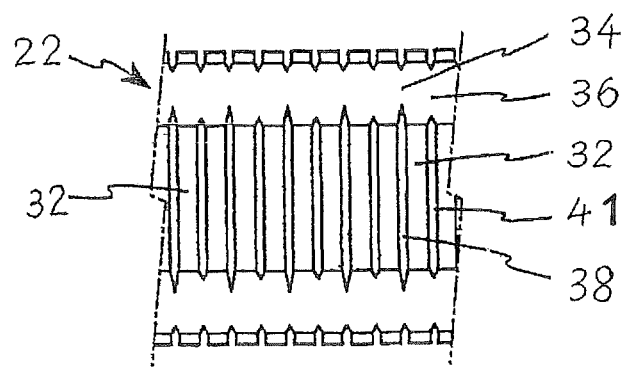
FIG. 2 is a partial plan view of an insert used in a conventional weather strip.
Figure 3:
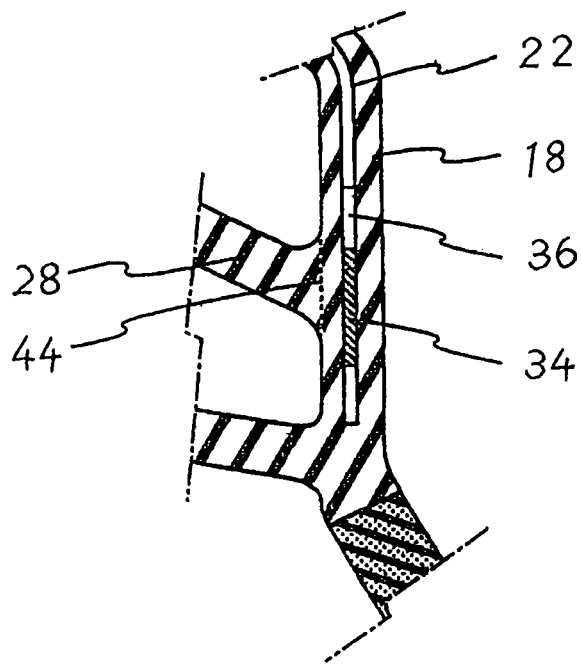
FIG. 3 is an enlarged partial sectional view of an inner side wall of a conventional weather strip for a motor vehicle, which is taken along a joining part of an insert used therein.
Figure 4:
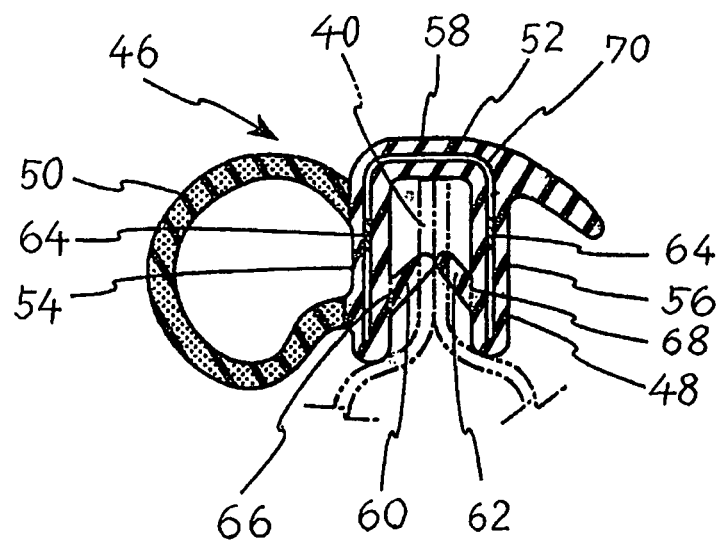
FIG. 4 is a cross-sectional view of another conventional weather strip for a motor vehicle, which is taken along joining parts of an insert used therein.
Figure 5:
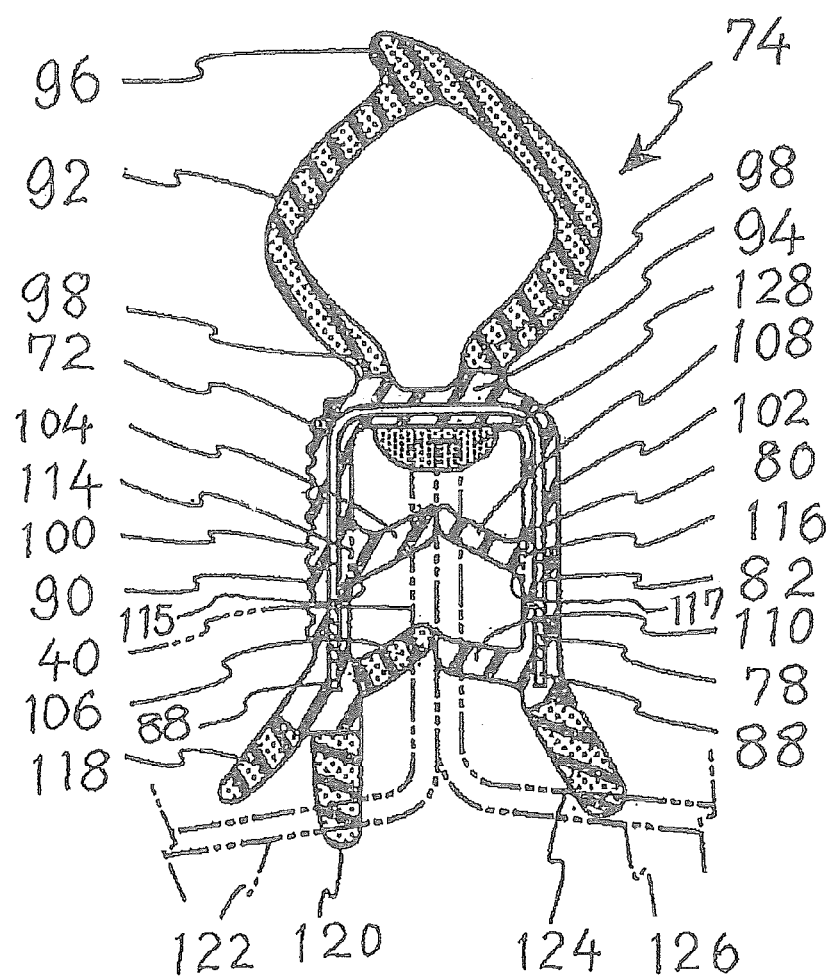
FIG. 5 is a cross-sectional view of a first embodiment of a weather strip for a motor vehicle in accordance with the present invention, which is taken along joining parts of an insert used therein.

Next, the weather strip 74 of a first embodiment of the present invention will be explained with reference to FIG. 5. FIG. 5 is a cross-sectional view of the weather strip 74. The weather strip 74 has a trim portion 90 as a base for attachment to a flange 40 formed along an opening portion, etc, in a vehicle body, and a tubular sealing portion 92

The tubular sealing portion 92 is integrally formed on an outer surface of a bottom wall 94. A lip-shaped part 96 is formed in a tip part of the tubular sealing portion 92, whereby when the tubular sealing portion 92 contacts a door or a bonnet, the sealing properties can be improved. A base 98 of the tubular sealing portion 92 is integrally formed with the bottom wall 94 of the trim portion 90.

The trim portion 90 is composed of a solid material or finely foaming material of a rubber-like elastic material such as rubber, a thermoplastic elastomer, a soft synthetic resin, etc., whereas the tubular sealing portion 92 is composed of a sponge material of a rubber-like elastic material such as rubber, a thermoplastic elastomer, etc.

The trim portion 90 includes an outer side wall 100, an inner side wall 102 and the bottom wall 94, and has a generally U-shaped cross-section. The insert 72 is embedded in the trim portion 90, and outer holding lips and inner holding lips are formed so as to project from interior surfaces of the outer side wall 100 and the inner side wall 102. Since the insert 72 is embedded in the trim portion 90, the outer holding lips and the inner holding lips exhibit strong holding forces against the flange 40, and when the thickness of the trim portion 90 is decreased, the trim portion 90 is prevented from coming out of the flange 40.

The thickness of the trim portion 90 inclusive of the covering layer thereof can range from 1.4 mm to 1.7 mm in the case of a solid material, and range from 1.7 mm to 2.2 mm in the case of a foamed material. Therefore, the thickness of the trim portion 90 can be reduced, and consequently, the weight of the weather strip 74 can be reduced, as compared with those of conventional trim portions. Where the thickness of the trim portion 90 is less than 1.4 mm in the case of the solid material, and less than 1.7 mm in the case of the foamed material, the covering layer may become too thin to cover the insert 72, whereas where the thickness of the trim portion 90 exceeds 1.7 mm in the case of the solid material, and 2.2 mm in the case of the foamed material, the covering layer becomes too thick to reduce the weight of the weather strip 74 sufficiently.

Figure 10:
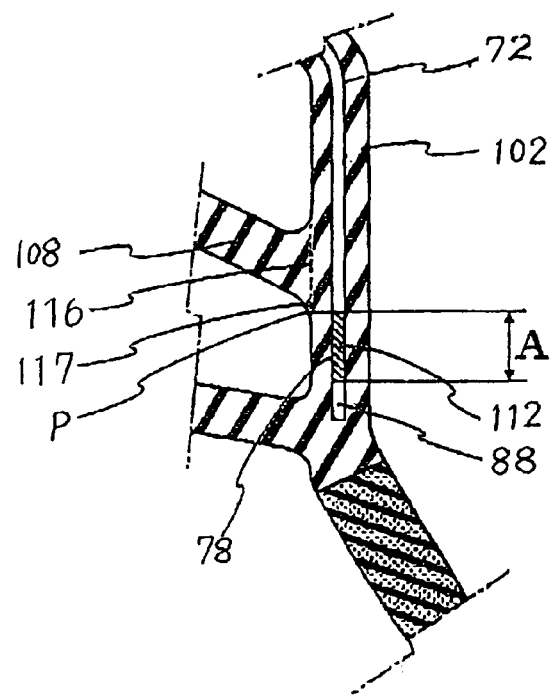
FIG. 10 is an enlarged sectional view of an inner side wall of a first embodiment of a weather strip for a motor vehicle in accordance with the present invention, which is taken along a joining part of an insert used therein.

With respect to the outer holding lip and the inner holding lip, It is preferable that a first outer holding lip 104 and a second outer holding lip 106 are formed to extend from an interior surface of the outer side wall 100 in this order from the side of the bottom wall 94, whereas a first inner holding lip 108 and a second inner holding lip 110 are formed from an interior surface of the inner side wall 102 in this order from the side of the bottom wall 94. In this case, the first outer holding lip 104 and the first inner holding lip 108 are formed so as to face each other, whereas the second outer holding lip 106 and the second inner holding lip 110 are formed so as to face each other. Consequently, the flange 40 can be stably held with facing holding lips.

Where two holding lips are respectively formed in the outer side wall 100 and the inner side wall 102, as shown in FIG. 5 and FIG. 10, a center 112 of the first joining part 78 (a center of a width "A" in FIG. 8, FIG. 9 and FIG. 10) is located away from parts facing a base 114 of the first outer holding lip 104 and a base 116 of the first inner holding lip 108 towards the end part 88 of the insert piece 76. More specifically, the center 112 of the first joining part 78 is located away from a lower end 115 of the base 114 of the first outer holding lip 104 and a lower end 117 of the base 116 of the first inner holding lip 108 towards the end part 88 of the insert piece 76. (Namely, the lower end 115 and the lower end 117 are located away from the center 112 towards the bottom wall 94.)

Therefore, the first slit 80 or a tip end thereof can be located so as to face the base 114 of the first outer holding lip 104 and the base 116 of the first inner holding lip 108, whereby the covering layer can be secured via the first slit 80. The base 114 refers to a base part of the first outer holding lip 104, in which the first outer holding lip 104 contacts the outer side wall 100, whereas the base 116 refers to a base part of the first inner holding lip 108, in which the first inner holding lip 108 contacts the inner side wall 102.

As a result, the base 114 of the first outer holding lip 104 and the base 116 of the first inner holding lip 108, which are located on a bottom of the trim portion 90, and are desired to increase flange holding forces, are prevented from peeling off the insert 72, whereby the flange holding forces can be restrained from lowering.

Where there is only one of each of the outer holding lip and the inner holding lip, the center 112 of the first joining part 78 is located away from parts facing bases of the single outer holding lip and the single inner holding lip towards the end 88 of the insert piece 76.

And, in order to further restrain the lowering of the flange holding forces, it is desirable to locate the lower end 115 of the base 114 of the first outer holding lip 104 and the lower end 117 of the base 116 of the first inner holding lip 108 away from a tip end P of the first slit 80 (shown in FIG. 9 and FIG. 10) towards the bottom wall 94. This arrangement may be applied to weather strips using inserts in the later-described second through fifth embodiments, too.

Figure 7:
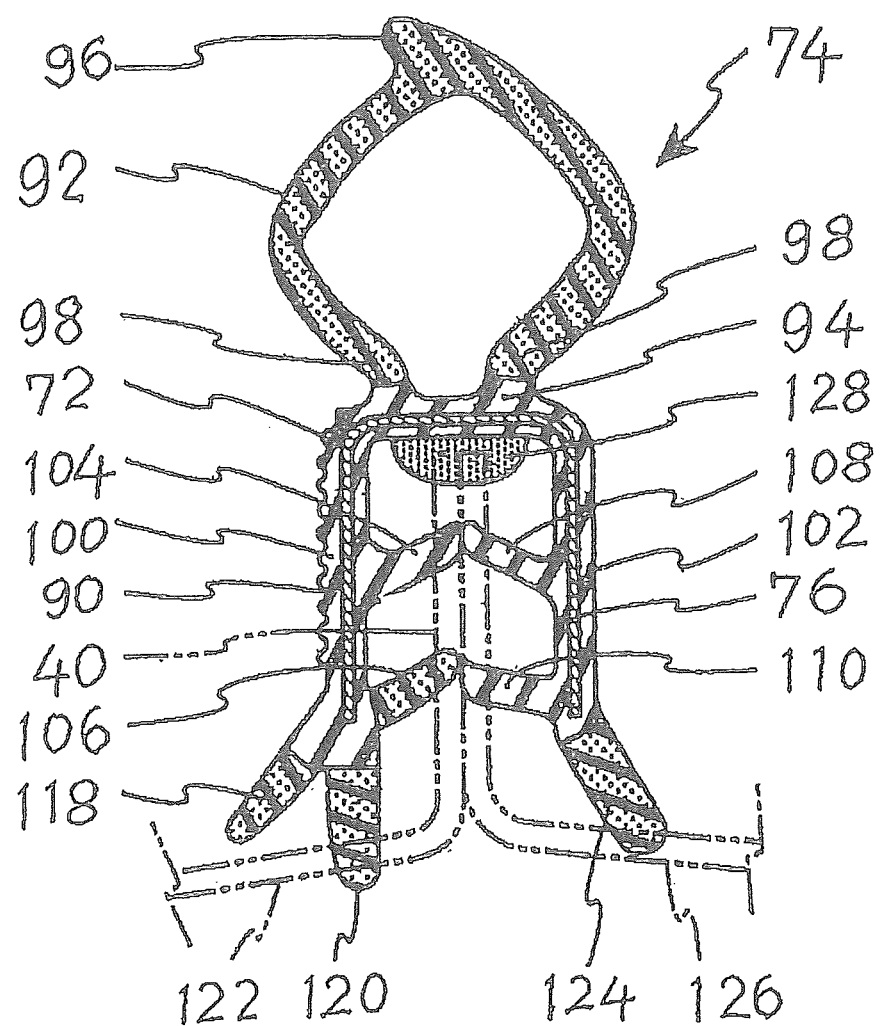
FIG. 7 is a cross-sectional view of a first embodiment of a weather strip for a motor vehicle in accordance with the present invention, which is taken along insert pieces of an insert used therein.

As shown in FIG. 7, in the area of the trim portion 90, in which the rectangular insert piece 76 exists, the rectangular insert piece 76 is embedded to extend from a base of the second outer holding lip 106 and a base of the second inner holding lip 110 towards ends of the outer side wall 100 and the inner side wall 102. With this arrangement, the insert 72 embedded in the outer side wall 100 and the inner side wall 102 can exhibit an improved holding force against the flange 40.

A first outer seal lip 118 and a second outer seal lip 120 are provided along the end of the outer side wall 100 to contact an outer panel 122 partly defining the flange 40, thereby providing a seal adapted to prevent rainwater and dust from intruding into a vehicle compartment. An inner seal lip 124 is provided along the end of the inner side wall 102 to contact an inner panel 126 partly defining the flange 40, thereby providing a seal adapted to prevent rainwater and dust from intruding into a vehicle compartment. And a sealer 128 is provided on an interior surface of the bottom wall 94 of the trim portion 90, and an end of the flange 40 is inserted in the sealer 128 to improve the sealing properties.

Next, a weather strip 130 of a second embodiment of the present invention will be explained. The weather strip 130 of the second embodiment differs from the weather strip 74 of the first embodiment in an insert 132 used therein, and remaining parts thereof are similar to those of the first embodiment, and accordingly, only different points will be explained, and explanations of similar points will be omitted.

Figure 12:
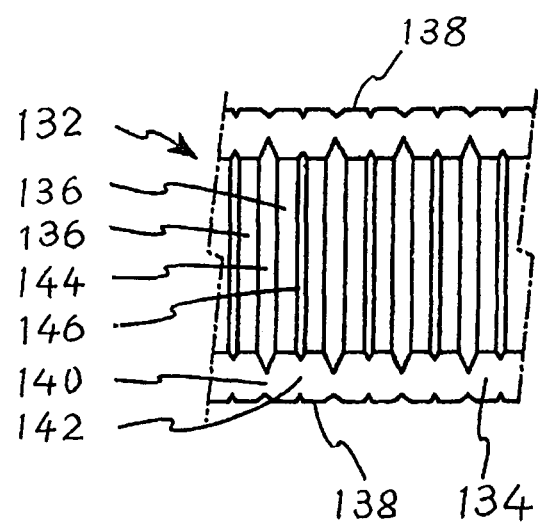
FIG. 12 is a partial plan view of an insert in a second embodiment of a weather strip for a motor vehicle in accordance with the present invention.

As shown in FIG. 12, the insert 132 to be used in the weather strip 130 of the second embodiment has rolled portions 134 that are formed at ends of rectangular insert pieces 136, but there are scarcely provided end parts 138 of the insert pieces 136. With this arrangement, first joining parts 140, second joining parts 142 and the rolled portions 134 are formed in the vicinity of the ends of the rectangular insert pieces 136.

Where the dimension "C" in the width direction of the insert 132 is equal to that of the insert 72, the width and the length of the rectangular insert pieces 136, the width of first slits 144 and that of second slits 146 are similar to those in the first embodiment, but the length of the first slits 144 and that of the second slits 146 are greater than those in the first embodiment, because the rolled portions 134 are formed on both sides of the insert 132.

In addition, both a center of the first joining part 140 and a center of the second joining part 142 can be located away from parts facing a base 150 of a first outer holding lip 152 and a base 154 of a first inner holding lip 156 towards ends of the insert piece 136. In this case, the base 150 of the first outer holding lip 152 and the base 154 of the first inner holding lip 156 are secured to the insert 132 in the second joining part 142, too, so that the holding force of a trim portion 148 against the flange 40 is restrained from lowering.

Figure 6:
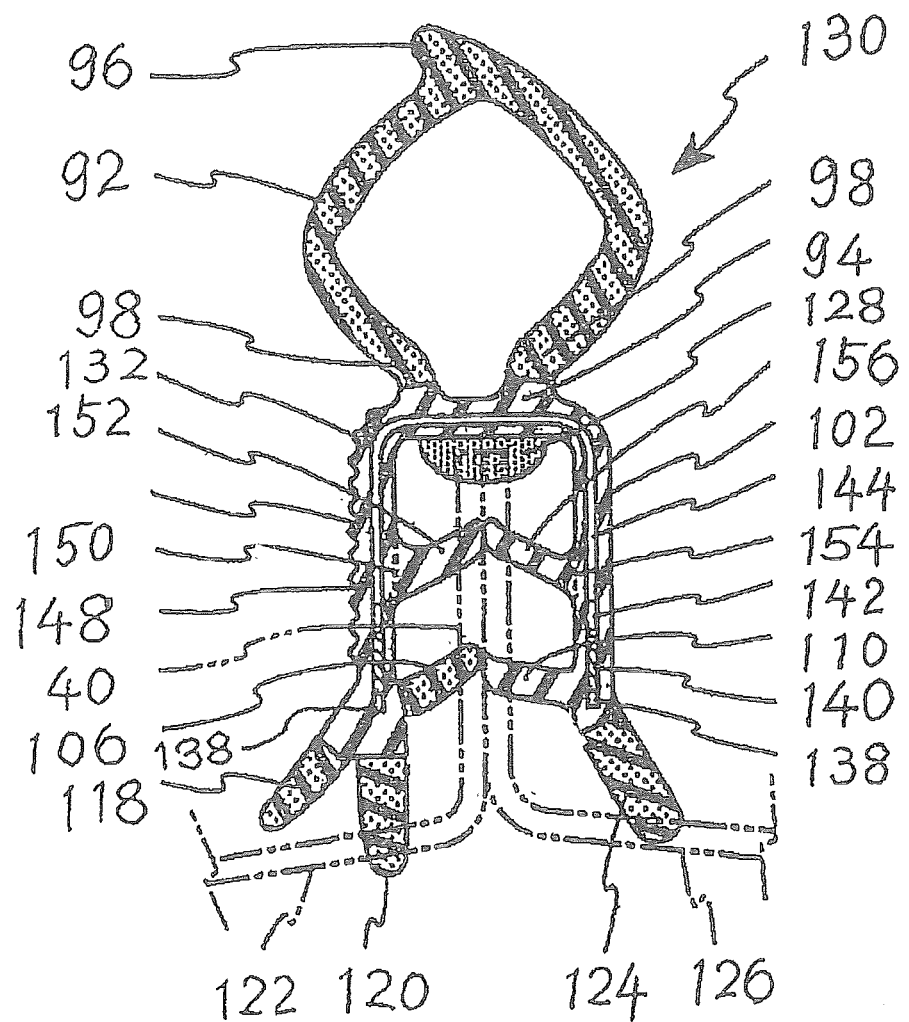
FIG. 6 is a cross-sectional view of a second embodiment of a weather strip for a motor vehicle in accordance with the present invention, which is taken along joining parts of an insert used therein.

With this arrangement, as shown in FIG. 6, in the trim portion 148 in which the insert 132 thus arranged is embedded, the first joining parts 140 are located on the side of the ends of the rectangular insert pieces 128, further, as compared to the insert 72 of the first embodiment, so that the first joining parts 140 can be entirely located away from parts facing the base 150 of the first outer holding lip 152 and the base 154 of the first inner holding lip 156 further towards the ends of the rectangular insert pieces 136. Therefore, the base 150 of the first outer holding lip 152 and the base 154 of the first inner holding lip 156 can be securely fixed to a covering layer, whereby the first outer holding lip 152 and the first inner holding lip 156 hold the flange 40 more strongly to restrain lowering of a holding force of the trim portion 148 against the flange 40.

Figure 13:
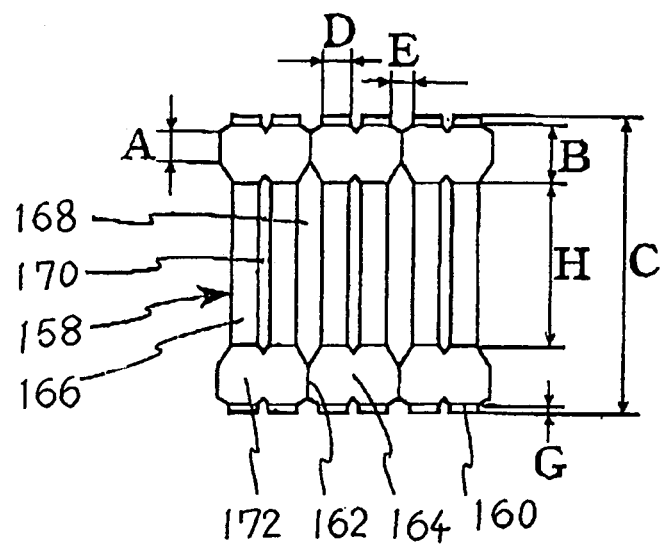
FIG. 13 is a partial plan view of an insert in a third embodiment of a weather strip for a motor vehicle in accordance with the present invention.

Next, a weather strip of a third embodiment of the present invention will be explained with reference to FIG. 13. The weather strip of the third embodiment differs from the weather strip 74 of the first embodiment in an insert 158 used therein, and remaining parts thereof are similar to those of the first embodiment, similarly to the second embodiment, and accordingly, only different points will be explained, and explanations of similar points will be omitted.

Figure 11:
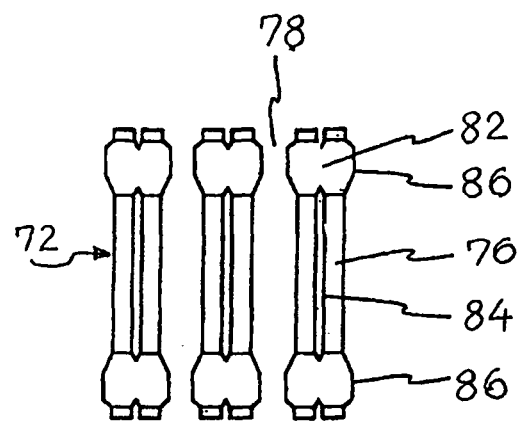
FIG. 11 is a partial plan view of an insert in a first embodiment of a weather strip for a motor vehicle in accordance with the present invention, which is after separated.

The insert 158 of the third embodiment is arranged such that end parts 160 thereof on the outer sides of both first joining parts 162 and second joining parts 164 respectively have a shorter length in the width direction of the insert 158 ("G" in FIG. 11). In the third embodiment, the length "G" is about 0.75 mm, and the preferred length "G" is 1 mm or less.

The length of insert pieces 166 ("H" in FIG. 13) is about 15 mm. The length of the insert pieces 166 ("H") is determined to range from 13 mm to 35 mm. The dimension of the insert 158 in the widthwise direction ("C" in FIG. 13) is 30 mm. The dimension "C" can be determined to range from 20 to 50 mm.

Therefore, the first joining parts 162 and the second joining parts 164 can be securely located away from parts facing the base 114 of the first outer holding lip 104 and the base 117 of the first inner holding lip 108 towards the ends of the rectangular insert pieces 166. Therefore, the base 114 of the first outer holding lip 104 and the base 117 of the first inner holding lip 108 can be securely fixed to a covering layer, thereby restraining lowering of a holding force of the trim portion against the flange. In addition, the first slit 168 and the second slit 170 can be formed long so that the holding force of the insert 158 is not greatly lowered, as compared to the case of the insert 72.

And the length of rolled portion 172 in the widthwise direction of the insert 158 ("B" in FIG. 13), which are formed at ends of the insert pieces 166 to define the first slits 168 and the second slits 170 is 5.9 mm. The dimension "B" of the rolled portions 172 is 4.9 mm, and is determined to range from 4 mm to 7 mm. Therefore, the rolled portions 172 can be extended in the longitudinal direction of the insert 158 due to the rolling work. As a result, the distance between the first slits 168 and the second slits 170 can be enlarged, and consequently, the insert 158 can be securely fixed to the covering layer.

Figure 14:
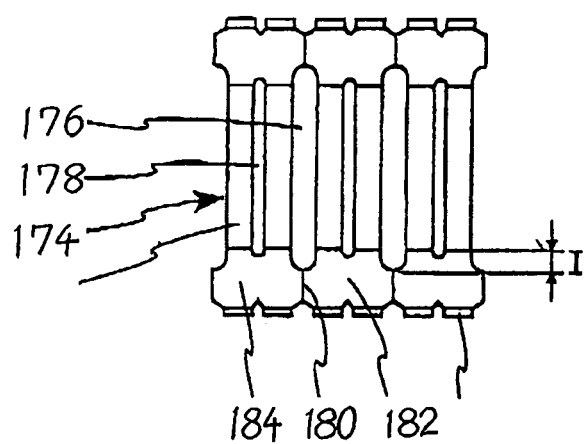
FIG. 14 is a partial plan view of an insert in a fourth embodiment of a weather strip for a motor vehicle in accordance with the present invention.

Next, a weather strip of a fourth embodiment of the present invention will be explained with reference to FIG. 14. The weather strip of the fourth embodiment differs from the weather strip 74 of the first embodiment in an insert 174 used therein, and remaining parts thereof are similar to those of the first embodiment, similarly to the second embodiment, and accordingly, only different points will be explained, and explanations of similar points will be omitted.

The insert 174 of the fourth embodiment has arc-shaped surfaces defining ends of first slits 176 and second slits 178. The first slits 176 and the second slits 178 of which ends are respectively formed into an arc-shaped configuration are produced by punching a sheet metal for the insert 174. Since the ends of the first slits 176 and the second slits 178 are respectively formed into an arc-shaped configuration, in the case that the dimensions "I" in FIG. 14 and "K" are equal to each other, the areas of the first slits 176 and the second slits 178 increase, as compared with the slits of the first embodiment, of which ends are respectively formed into a triangular configuration, whereby the area for fixing the covering layer can be enlarged. Where first joining parts 180 and second joining parts 182 respectively formed at ends of the first slits 176 and the second slits 178, each having an arc-shaped configuration, are rolled to provide rolled portions 184, the first joining parts 180 readily break.

Figure 15:
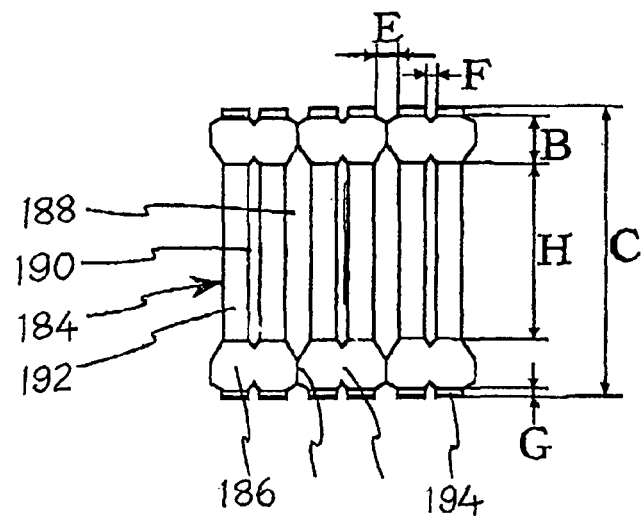
FIG. 15 is a partial plan view of an insert in a fifth embodiment of a weather strip for a motor vehicle in accordance with the present invention.

Next, a weather strip of a fifth embodiment of the present invention will be explained with reference to FIG. 15. The weather strip of the fifth embodiment differs from the weather strip 74 of the first embodiment in an insert 184 used therein, and remaining parts thereof are similar to those of the first embodiment, similarly to the second embodiment, and accordingly, only different points will be explained, and explanations of similar points will be omitted.

The insert 184 of the fifth embodiment is arranged such that the length of rolled portions 186 ("B" in FIG. 15) in the width direction of the insert 184 is formed short, whereas the lengths of the first slits 188 and the second slits 190 are formed long, as compared to those in the third embodiment.

The length (B) of the rolled portions 186 in the width direction of the insert 184 is about 3.5 mm. Therefore, the length of the insert pieces ("H" in FIG. 13) is about 22 mm. The length of insert pieces 192 is determined to range from 15 mm to 37 mm. With this arrangement, the area of the first slits 188 and the second slits 190 is increased, as compared to the case of the first embodiment having an equal dimension C, whereby the area for fixing the covering layer can be enlarged.

The length of the insert 184 in the width direction thereof ("C" in FIG. 15), the width (E) of the first slit 188, the width (F) of the second slit 190 and the dimension (G) of an end 194 of the insert piece 192 in the width direction of the insert 184 are equal to those in the third embodiment.

Figure 16:
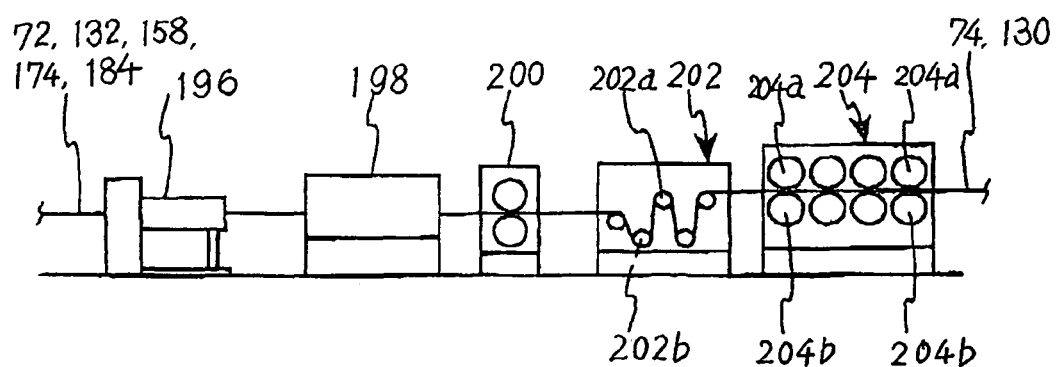
FIG. 16 is a schematic diagram showing processes of extruding a weather strip in embodiments of the present invention, and separating an insert therein.

Next, the producing method of the weather strips as long products using the inserts 72, 132, 158, 174 and 184 thus prepared will be explained with reference to FIG. 16. FIG. 16 is a schematic diagram showing the producing steps of the weather strips.

The inserts 72, 132, 158, 174 and 184 thus prepared are fed to an extruder 196, similarly to the conventional method, and are covered with a covering layer composed of a rubber-like elastic material such as synthetic rubber, a thermoplastic elastomer, etc., thereby forming the trim portions 90, 148, etc. and the tubular sealing portion 92. As a result, the weather strips are formed. Then, in the case that the covering layer is composed of rubber, the weather strips are fed to a vulcanizing chamber 198, and heated and vulcanized with a hot air, ultra high frequency wave, etc. It is preferable that the trim portions 90, 148, etc. are composed of a solid material, whereas the tubular sealing portion 92 is composed of a sponge material.

The weather strips thus vulcanized are taken up with a take-up machine 200. Then, in order to improve the flexibility of the weather strips, only the first joining parts of the inserts 72, 132, 158, 174 and 184 are broken with an insert separating machine 202. The insert separating machine 202 includes a plurality of upper separating rolls 202a and a plurality of lower separating rolls 202b. The insert separating machine 202 operates to pass the weather strips between the upper separating rolls 202a and the lower separating rolls 202b in a zigzag configuration, thereby bending the weather strips repeatedly, and breaking the first joining parts of the inserts 72, 132, 158, 174 and 184 due to metal fatigue thereof.

The weather strips in which the first joining parts of the inserts 72, 132, 158, 174 and 184 are broken, are fed to a bending machine 204, and bent with upper bending rolls 204a and lower bending rolls 204b so as to have a generally U-shaped cross-section shown in FIGS. 5, 6 and 7. The weather strips thus bent are subjected to the cutting operation, and ends thereof are subjected to the molding operation, similarly to the conventional method. As a result, the weather strips as products are obtained.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A weather strip, including:
a trim portion for holding a flange provided around an opening portion of a vehicle body of a motor vehicle, or a closing member for closing the opening portion, and a sealing portion for contacting and sealing a facing member,
wherein said trim portion comprises an outer side wall, an inner side wall, and a bottom wall with a generally U-shaped cross-section, said trim portion comprises an outer holding lip formed to extend from an interior surface of said outer side wall, and an inner holding lip formed to extend from an interior surface of said inner side wall, an insert formed by processing a band-shaped metallic plate being embedded in the trim portion,
wherein said insert includes a predetermined number of insert pieces, each having a rectangular configuration and extending in a width direction of said band-shaped metallic plate, said insert pieces are joined with joining parts in a longitudinal direction of said band-shaped metallic plate in a vicinity of ends of said insert pieces into a ladder-shaped configuration, said insert pieces define slits between adjacent insert pieces, and widthwise centers of said joining parts are located at a predetermined distance from parts facing a base of said outer holding lip and a base of said inner holding lip towards said ends of said insert pieces, wherein said slits include first slits, each having a width in a longitudinal direction of said insert, and second slits, each having a width smaller than that of said first slits in said longitudinal direction of said insert, said first slits and said second slits are alternately arranged in said longitudinal direction, and said insert is separated along said first slits after a production of said weather strip, wherein said joining parts include first joining parts, each being formed at an end of each of said first slits and having a width in a width direction of said insert, and second joining parts, each being faulted at an end of each of said second slits and having a width larger than that of said first joining parts in said width direction, said first joining parts and said second joining parts are alternately arranged in said longitudinal direction of said insert, and said first joining parts are separated such that pairs of said insert pieces joined are separated from one another, wherein said trim portion comprises a first outer holding lip and a second outer holding lip foamed to extend from the interior surface of said outer side wall from a side of said bottom wall, and includes a first inner holding lip and a second inner holding lip formed from an interior surface of said inner side wall from the side of said bottom wall, a center of said first joining parts being at a distance from parts facing the base of said first outer holding lip and the base of said first inner holding lip towards said ends of said insert pieces, wherein said first outer holding lip and said first inner holding lip are respectively formed in the outer side wall and the inner side wall, and wherein an entirety of the first joining parts extends between the base of the first inner holding lip and the base of the second inner holding lip.

2. A weather strip as claimed in claim 1, wherein an entire part of said first joining parts is located at the distance from parts facing a base of said first outer holding lip and a base of said first inner holding lip towards said ends of said insert pieces.

3. A weather strip as claimed in claim 1, wherein a center of said first joining parts and a center of said second joining parts are located at the distance from parts facing a base of said first outer holding lip and a base of said first inner holding lip towards said ends of said insert pieces.

4. A weather strip as claimed in claim 1, wherein surfaces of said joining parts, which define ends of said slits, are respectively formed into an arc-shaped notch.

5. A weather strip as claimed in claim 1, wherein a notch provided in said first joining parts has a depth at least equal to the width of said first slits.

6. A weather strip as claimed claim 1, wherein a portion is provided along said ends of said insert pieces, respectively, and an inner side section of said portion, which is defined between ends of said first slits and an inner side end of said rolled portion, includes ends of said first slits and said second slits, in which a material other than metal of the insert exists, in a ratio of 5% or more.

7. A weather strip as claimed in claim 1, wherein the center of the first joining parts is defined in the width direction of said insert.

8. A weather strip, including:
a trim portion for holding a flange provided around an opening portion of a vehicle body of a motor vehicle, or a closing member for closing the opening portion, and a sealing portion for contacting and sealing a facing member, wherein said trim portion comprises an outer side wall, an inner side wall, and a bottom wall with a generally U-shaped cross-section, said trim portion comprises an outer holding lip formed to extend from an interior surface of said outer side wall, and an inner holding lip formed to extend from an interior surface of said inner side wall, an insert formed by processing a band-shaped metallic plate being embedded in the trim portion, wherein said insert includes a predetermined number of insert pieces, each having a rectangular configuration and extending in a width direction of said band-shaped metallic plate, said insert pieces are joined with joining parts in a longitudinal direction of said band-shaped metallic plate in a vicinity of ends of said insert pieces into a ladder-shaped configuration, said insert pieces define slits between adjacent insert pieces, and widthwise centers of said joining parts are located at a predetermined distance from parts facing a base of said outer holding lip and a base of said inner holding lip towards said ends of said insert pieces, wherein said slits include first slits, each having a width in a longitudinal direction of said insert, and second slits, each having a width smaller than that of said first slits in said longitudinal direction of said insert, said first slits and said second slits are alternately arranged in said longitudinal direction, and said insert is separated along said first slits after a production of said weather strip, wherein said joining parts include first joining parts, each being formed at an end of each of said first slits and having a width in a width direction of said insert, and second joining parts, each being formed at an end of each of said second slits and having a width larger than that of said first joining parts in said width direction, said first joining parts and said second joining parts are alternately arranged in said longitudinal direction of said insert, and said first joining parts are separated such that pairs of said insert pieces joined are separated from one another, wherein said trim portion comprises a first outer holding lip and a second outer holding lip formed to extend from the interior surface of said outer side wall from a side of said bottom wall, and includes a first inner holding lip and a second inner holding lip formed from an interior surface of said inner side wall from the side of said bottom wall, a center of said first joining parts being at a distance from parts facing the base of said first outer holding lip and the base of said first inner holding lip towards said ends of said insert pieces, wherein said first outer holding lip and said first inner holding lip are respectively formed in the outer side wall and the inner side wall, wherein the center of the first joining parts is defined in the width direction of said insert, and wherein an entirety of the first joining parts extends between the base of the first inner holding lip and the base of the second inner holding lip.

9. A weather strip as claimed in claim 8, wherein the center of the first joining parts is located in a section of said inner side wall that is located between the lower end of the base of the first inner holding lip and the lower end of the base of the second inner holding lip.

10. A weather strip as claimed in claim 9, wherein the section of said inner side wall is located below the lower end of the base of the first inner holding lip and above the lower end of the base of the second inner holding lip.

11. A weather strip as claimed in claim 1, wherein the center of the first joining parts is located in a section of said inner side wall that is located between the lower end of the base of the first inner holding lip and the lower end of the base of the second inner holding lip.

12. A weather strip as claimed in claim 11, wherein the section of said inner side wall is located below the lower end of the base of the first inner holding lip and above the lower end of the base of the second inner holding lip.

* * * * *